Sept. 30, 1952 S. F. ANDERSON 2,612,016
FOLDING AND FILLING MACHINE
Filed Aug. 16, 1946 9 Sheets-Sheet 1

INVENTOR.
Swan F. Anderson
BY
McCanna and Morsbach
ATTYS.

Sept. 30, 1952 S. F. ANDERSON 2,612,016
FOLDING AND FILLING MACHINE
Filed Aug. 16, 1946 9 Sheets-Sheet 3

INVENTOR.
Swan F. Anderson
BY
McCanna and Marzbach
ATTY'S.

Sept. 30, 1952  S. F. ANDERSON  2,612,016
FOLDING AND FILLING MACHINE
Filed Aug. 16, 1946  9 Sheets-Sheet 6

INVENTOR
Swan F. Anderson
BY
McCanna and Morsbach
ATTYS.

Sept. 30, 1952 S. F. ANDERSON 2,612,016
FOLDING AND FILLING MACHINE
Filed Aug. 16, 1946 9 Sheets-Sheet 9

INVENTOR.
Swan F. Anderson
BY
McCanna and Morsbach
ATT'YS.

Patented Sept. 30, 1952

2,612,016

UNITED STATES PATENT OFFICE 2,612,016

FOLDING AND FILLING MACHINE

Swan F. Anderson, Rockford, Ill., assignor, by mesne assignments, of one-half to Ralph F. Anderson, Rockford, Ill.

Application August 16, 1946, Serial No. 690,883

13 Claims. (Cl. 53—56)

This invention relates generally to an automatic folding and filling machine, particularly to a machine for automatically opening or setting up cartons which are initially supplied to the machine in a flat or knocked-down configuration, folding and interlocking the flaps at one end of the carton, filling the carton through the open end with a preferred material, and then folding and interlocking the remaining flaps.

The steps of producing certain packaged materials, for example, ice cream, have long involved a bottleneck in setting up the cartons by hand and in some cases filling them by hand. This hand operation has been wastefully slow and, where it included hand filling of the cartons, it was also wasteful of material since it is inherently less consistent than the machine in filling each carton to exactly the same extent, thereby requiring either that cut and try methods be employed for each carton, or that each be definitely filled with an excess to be sure that the carton will contain the specified quantity.

Accordingly it is an object of the present invention to provide a compact packaging machine which automatically sets up a knocked-down carton, fills it with ice cream or other material, and then closes the carton which steps are performed in sequential step-by-step fashion in response to the carton becoming filled to the desired degree.

Another object of the invention is the provision of a device of the character described which is of simple construction, has a minimum of parts, and will operate continuously and consistently with a minimum of service trouble.

The machine is completely automatic in that knocked-down cartons and ice cream are continuously fed into it, and completely packed and closed cartons containing a definite amount of ice cream or other material are continuously taken from it.

Another object of the present invention is the provision of an automatic packaging machine for ice cream or the like in which the flow of that material is continuous, thereby making it unnecessary to provide additional control means to start and stop the flow; and another object in this connection is the provision of a structure in which the carton itself is conveyed through a series of operative positions during which the various steps of folding and filling the carton are carried out and in which the carton is moved at the end of the filling step to shear off the ice cream flush with the top of the carton, thereby, in effect, making the upper edge of the carton which shears off the ice cream an operative element of the machine.

A further object is the provision of spaced stationary members positioned along the course of movement of the carton which are formed to guide opposed flaps at the end of the carton to a closed and interlocked position as the carton is moved along the course.

Other objects and advantages will become apparent from the following description in connection with the drawings, in which—

Figure 1 is a perspective view of a folding and filling machine illustrating one embodiment of the present invention;

Fig. 1a is an enlarged view of a portion of Figure 1;

Fig. 2a is a sectional view of Fig. 2, taken on line 2a—2a;

Fig. 15 is an enlarged fragmentary view of

Fig. 4 showing the normal position of the lever which is employed to push down the upper leading flap just before the carton is moved into the filling housing;

Figures 1, 1A, 2A:
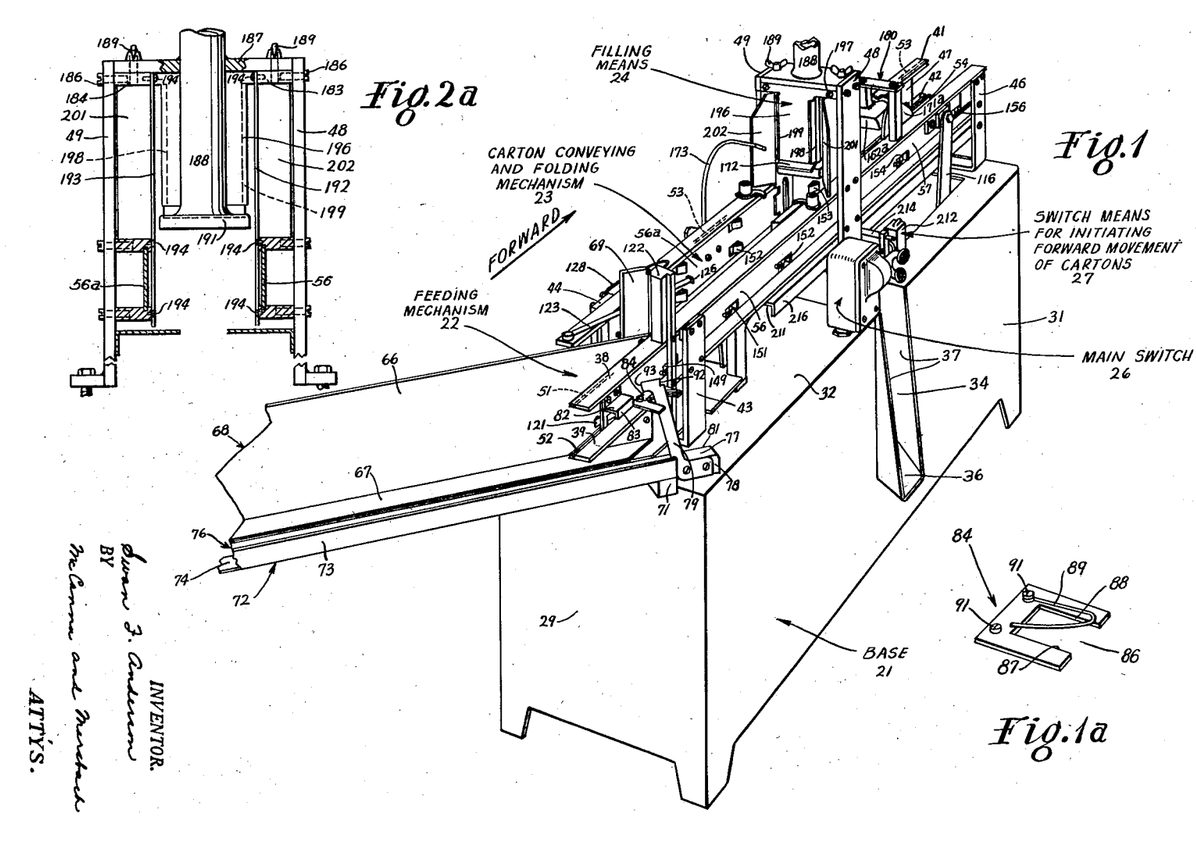

Referring now in more detail to the embodiment of the present invention shown in the drawings, and referring particularly to Figure 1, the machine comprises generally a base member 21, feeding mechanism 22, carton conveying and folding mechanism 23, a filling means 24, a manually operable main switch 26, and automatically operable switch means 27 adapted to initiate operation of the driving means 28.

The base 21 in the present instance is made of sheet metal having upstanding end walls 29 and front and back walls 31, a top or table surface 32, and an interior floor 33. An intermediate inclined channel 34 is formed beneath the filling means 24 to catch any drop or overflow when the machine is employed to package ice cream, or similar frozen liquids. This drip channel 34 comprises a lower surface 36 inclined at substantially 45° to the top surface 32 and the spaced triangular side walls 37.

Figures 9, 10, 11, 12, 13, 14:
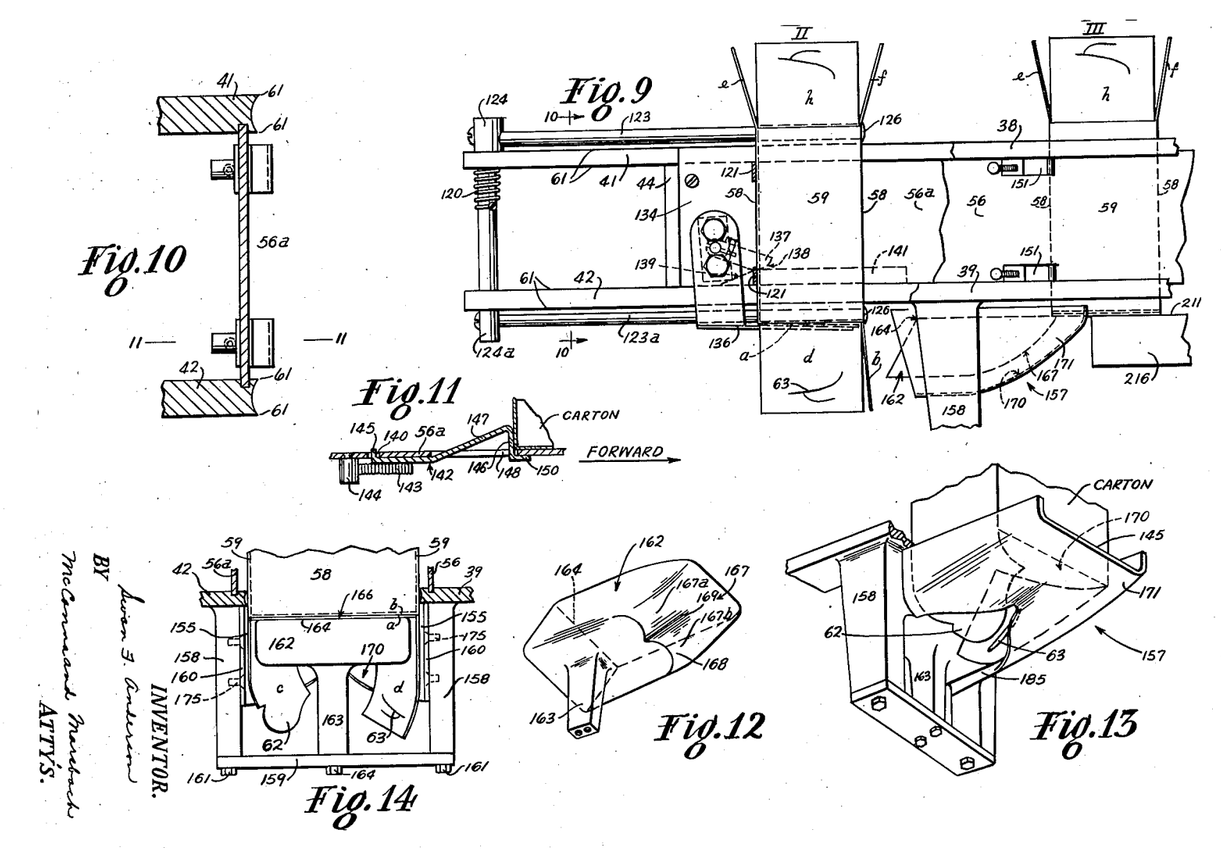
Fig. 9 is an enlarged partially cut away front view of the inlet of the machine showing the means employed to fold and interlock the flaps at the bottom of the carton.
Fig. 10 is a partial sectional view of Fig. 9 taken along the line 10—10 showing one of the slide members which carry the movable pawls and showing the grooved frame members in which the slide member is movable.
Fig. 11 is a sectional view of Fig. 10 taken on the line 11—11 showing another view of one of the pawls.
Fig. 12 is a perspective view of a contoured folding block employed in the folding of the lower flaps.
Fig. 13 is a perspective view of a sub-assembly showing the contoured shell and other parts surrounding the folding block of Fig. 12.
Fig. 14 is an end view of Fig. 13 taken from the left or inlet end.

The carton conveying and folding mechanism previously generally designated 23 includes pairs of longitudinal carton supporting means or rails 38, 39 and 41, 42 which are mounted above the table surface 32 by means of bolted uprights 43, 44, 46, 47, 48 and 49. While bolts are employed to hold these parts together as well as many of the other parts shown in the machine, it will be obvious that other suitable means such as welding or soldering may be employed throughout. It will be noted that rails 38, 39 are longer at the inlet end than 41, 42 to facilitate the feeding of cartons, as will be described. The inner, opposed surfaces of the rails are formed with pairs of grooves 51, 52 and 53, 54, extending the entire length of the rail in each case. Grooves 51, 52 have a slide member 56 reciprocably mounted therein and grooves 53, 54 have a similar slide member 56a reciprocable therein. The slides 56 and 56a constitute driving means for the cartons and are movable forward and backward with one another although they are not exactly identical, the slide 56 being somewhat longer to facilitate feeding of individual cartons, as will be described.

Figures 23, 24, 25:
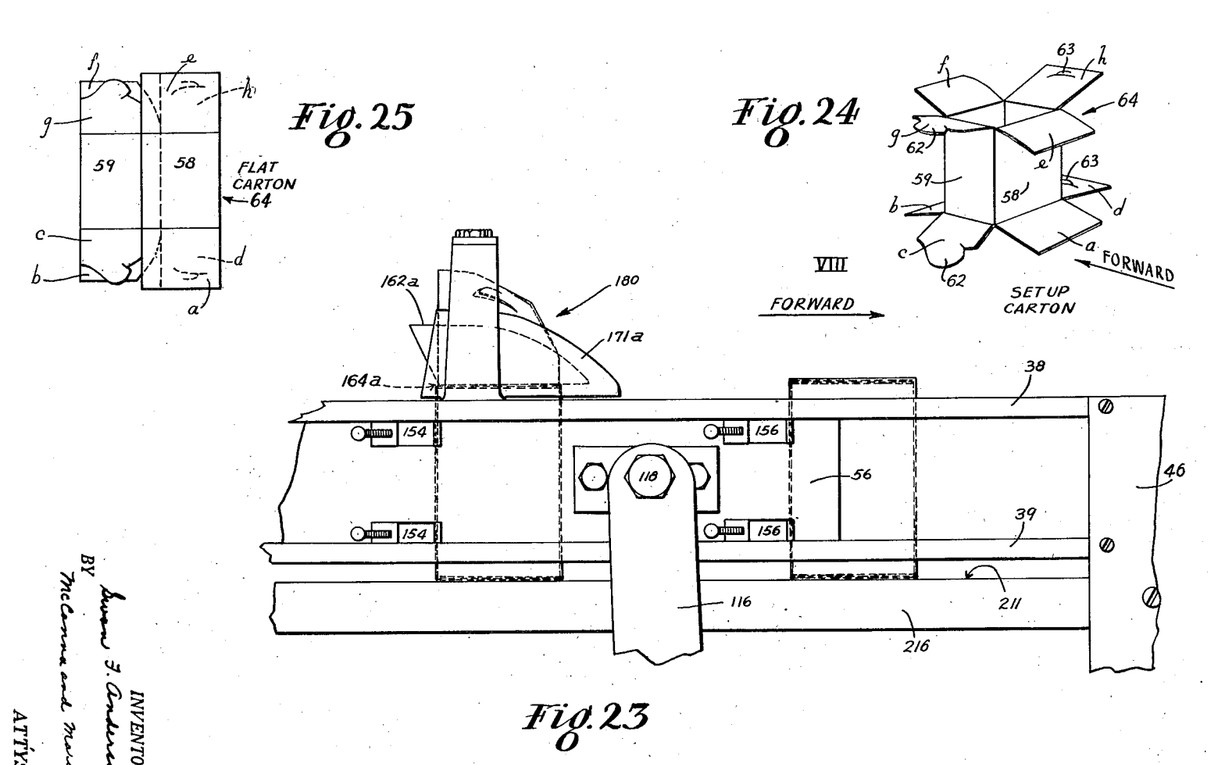
Fig. 23 is an enlarged fragmentary front view of the outlet end of the machine showing the means employed to fold and interlock the last three top flaps.
Fig. 24 is a perspective view of a carton of the type commonly used for packaging ice cream showing in opened condition the various top and bottom flaps and which this particular modification of the present invention is employed to set up, close the ends of, and fill with ice cream or other material.
Fig. 25 is a flattened or knocked-down view of the carton of Fig. 24 showing the condition in which the carton is supplied to save space in shipment and storage, this flattened shape being the condition in which it is received by the machine.

Before continuing the description of the carton conveying and folding mechanism 23, the carton itself and the stacking and feeding mechanism will be described. Referring first to Fig. 25, the carton there generally designated 24 is shown in its flattened or knocked-down condition in which it is usually supplied to the manufacturer of ice cream and the like to conserve space in shipment and storage. Fig. 24 shows the same carton in open or set-up condition so that its body walls 58 and 59 form a rectangle. In this view the ends are opened showing lower flaps $a$, $b$, $c$ and $d$ and upper flaps $e$, $f$, $g$ and $h$. In the packaging machine of the present invention, the body walls 59 are gripped by the knife edges 61 (Fig. 10) of the rails, and in the particular modification which will be described, the carton will be moved through the machine in the forward direction indicated by the arrow shown in Fig. 24 while thus supported on the rails; thus, for convenience in description, the flaps $b$ and $f$ may be referred to as "leading flaps" and $a$ and $e$ may be referred to as "trailing flaps." In the same manner and for the same reason, flaps $c$ and $d$ which interlock at the bottom and flaps $g$ and $h$ which interlock at the top may be referred to as "side flaps," adapted to be interlocked by insertion of the fingers 62 within the slots 63.

Figure 2:
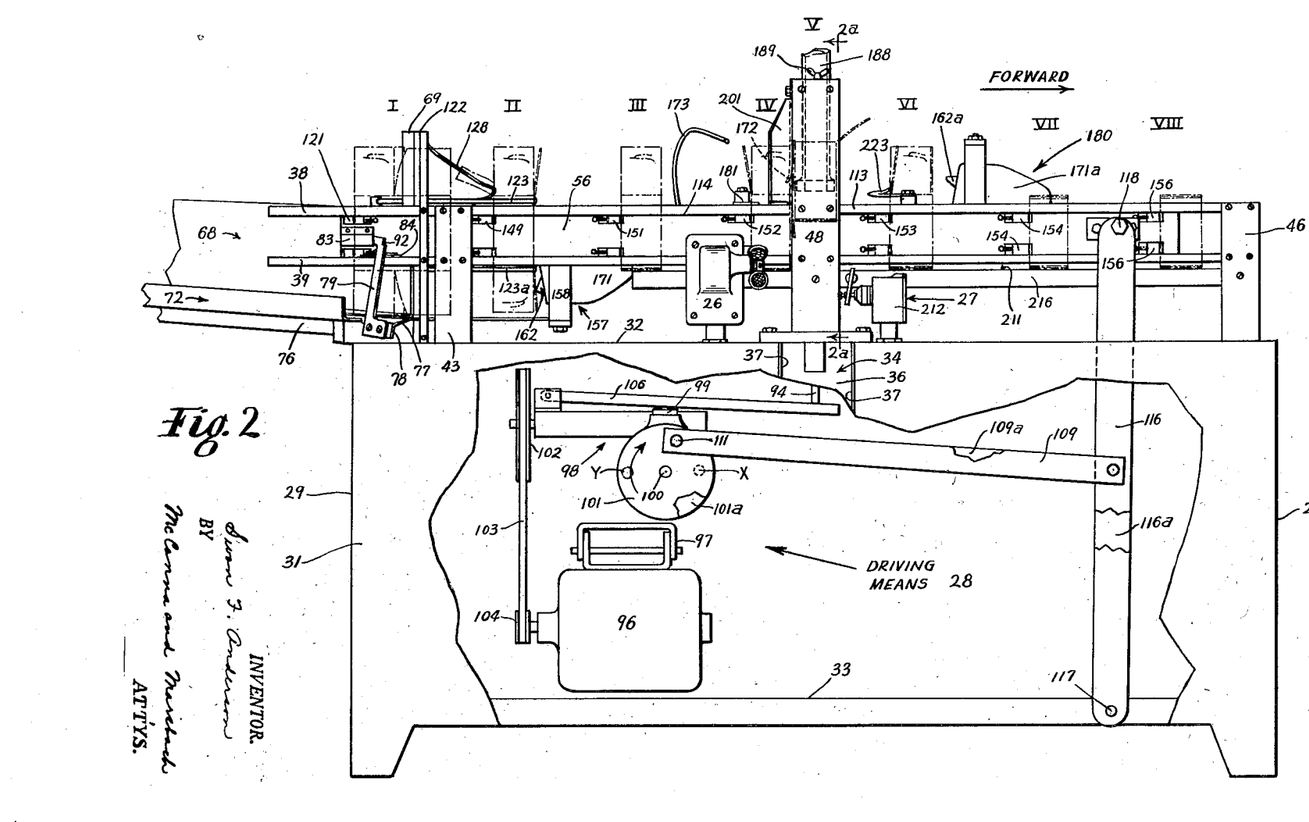
Fig. 2 is a front view of the machine shown in Figure 1, cut away to show the interior driving means.
Figure 3:
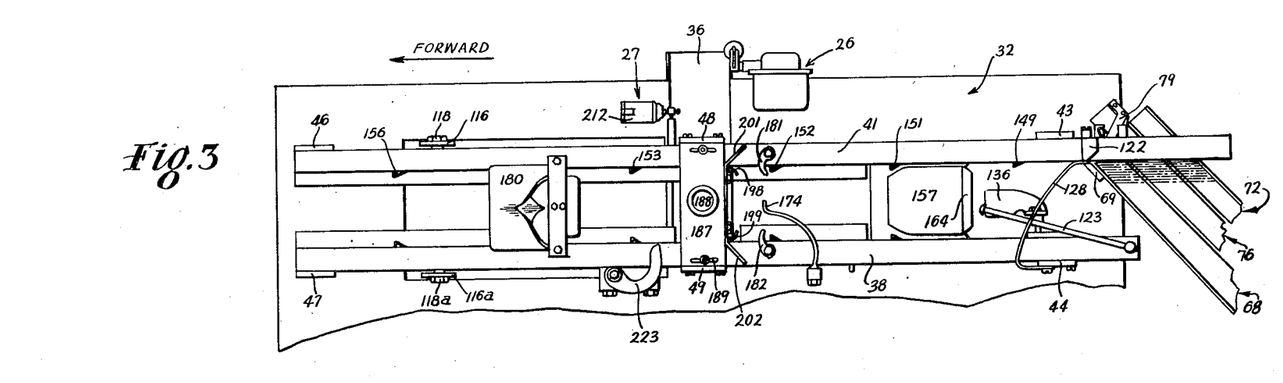
Fig. 3 is a top view of the machine shown in Figures 1 and 2.
Figures 5, 6, 7, 8:
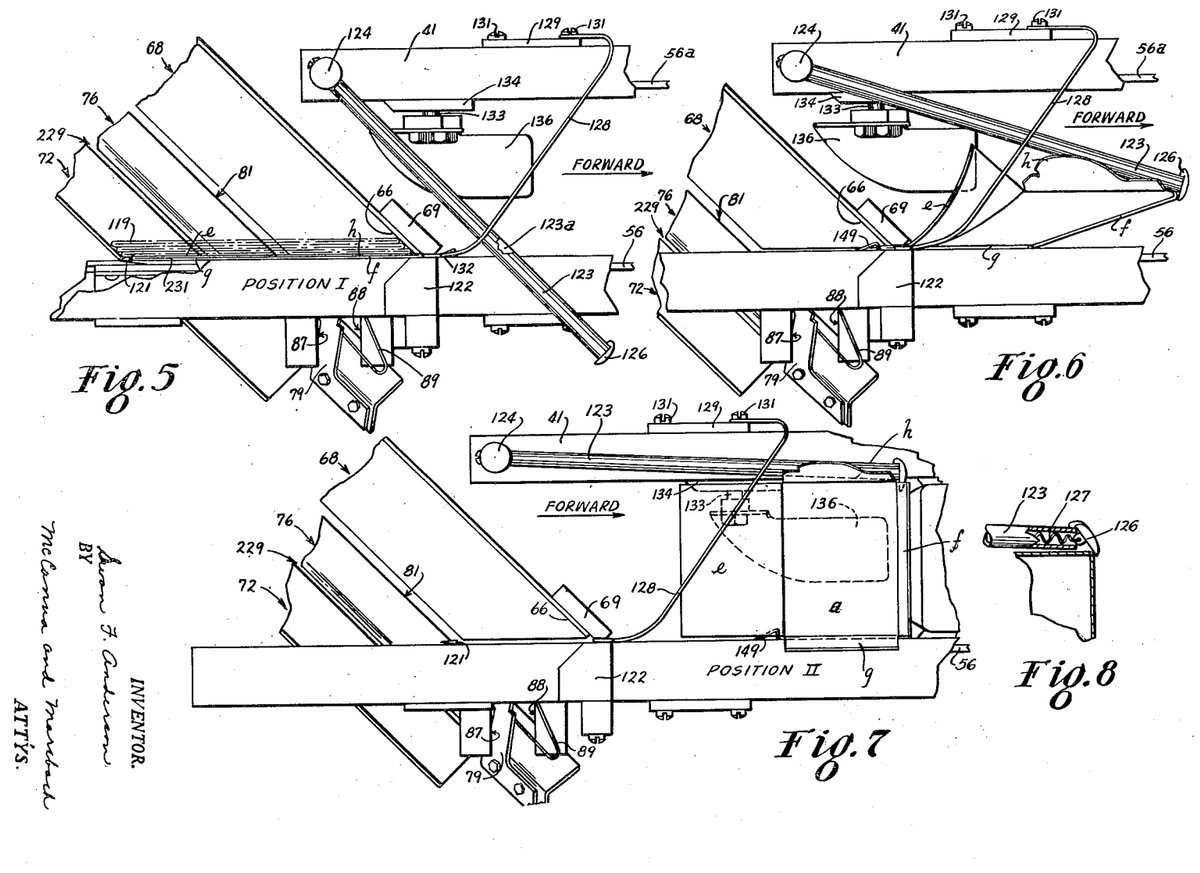
Figs. 5, 6 and 7 are partial top view of the inlet end of the machine shown in three different operative positions in setting up an initially flat carton.
Fig. 8 is a fragmentary view of the end of one of the restraining bars shown in the previous three figures and illustrates how its transverse spring-held releasable end portion may be pushed aside to permit the carton to move past it.

The feeding mechanism or carton magazine, generally designated 22, may take a number of different forms, as will be obvious, and may consist of any suitable arrangement of parts in which a number of flat cartons 64, such as shown in Fig. 25, may be stacked, and from which stack the cartons will be fed one at a time into the machine. In the present instance this part of the magazine is best shown in Figures 1, 2, 3, 5, 6 and 7. It includes a relatively large L cross-section plate 68 having a vertical leg 66 and a horizontal leg 67. The forward end of the plate 68 is fastened in any suitable manner, as by attachment to the upright 69 which in turn is mounted on the table top 32; the opposed or inlet end will usually be mounted by brackets (not shown) which are in turn mounted on the base. The upright wall 66 is positioned at an angle, in this case about 45°, with respect to the path or course defined by the rails (Fig. 3). The bottom of the plate 68, comprising the narrow floor portion 67, is mounted upon a supporting block 71 which, in turn, is mounted upon the base top 32. At the end of the black 71 is mounted an angle iron 72 having a narrow upstanding wall 73 parallel with the wall 66 and having a narrow floor portion 74 substantially coplanar with and spaced from the opposite floor portion 67. In the space between the two floor portions 67 and 74 is a longitudinal angle member 76 formed with an obtuse angle (shown best in Fig. 2) having a floor portion 77 normally substantially coplanar with the floor portions 67 and 74 and a depending wall 78 to which the lever member 79 is attached by means of bolts. The ends of the members 68, 72 and 76 remote from the machine are supported by any suitable means (not shown). The obtuse angle member 76 is supported loosely to be capable of a limited degree of tilting and forward and backward movement. The upstanding walls 66 and 73 define a feeding channel which is wide enough to carry a stack of flat cartons, each carton in the stack being approximately parallel with the rails and slide members, as best shown in Fig. 5. Thus, it will be seen that when the obtuse angle member 76 is tipped to raise its edge 81 slightly upward and forward (that is, to the right in Figure 1) the stack of cartons will be raised and urged slightly forward. This upward and forward movement of the edge 81 will be effected each time the slide 56 moves through a complete forward and backward cycle by the co-action of parts now to be described. Mounted on the end of the slide 56 is a cam member 82 (see Figure 1) having a downwardly extending portion 83 which is spaced outward some distance from the slide 56. Mounted on the rail 39 is a flat sheet metal element 84 (shown enlarged in Figure 1a). A notch 86 is formed therein having spaced parallel edges 87 and 88 which are approximately at right angles to the axis of the rail 39 (that is, approximately 45° with respect to the longitudinal axis of the obtuse angle member 76). A formed wire spring 89 is supported on one of two mounting bolts 91 and provides some resistance to the movement of the lever 79 toward the edge 88 when slide 56 is moved backward. In operation the parts just described coact to effect forward feeding action of the cartons as follows: when the slide 56 is moved forward, the downward extension 83 of the cam member 82 is moved forwardly over the top of the lever 79 engaging the surface 92 thereon and merely sliding past it without effecting any substantial movement of the obtuse angle member 76 since the latter will merely be tipped forward slightly against the resistance of wire spring 89. In the backward movement of the slide 56, however, the outer surface of the cam extension 83 will engage the end of the extension 93 on the lever 79 and, instead of merely tipping the lever it will move the entire lever outward along the edge 87 of the plate 84 so that in addition to tipping the angle member edge 81 upward into contact with the bottoms of the cartons it will also be moved forward. In this manner, all cartons will thus be edged forward each time the slide 56 is reciprocated through complete forward and backward motions.

Referring now to the operating means generally designated 28, many types of drives are available for this purpose including electric, hydraulic, and mechanical means. For the particular slide mechanism shown, any operating means is satisfactory that will reciprocate the slides 56 and 56a simultaneously through one complete reciprocation each time switch means 27 is actuated. Each time a carton is filled the pair of slides 56, 56a will be moved simultaneously forward, then backward, then forward to their original positions. It will be seen however that other specific reciprocating cycles may be employed. Coincidentally with the reciprocation of the slides, the lifting rod 94 (the purpose of which is to be described subsequently) will be lifted and lowered once. One means for effecting this operation is disclosed more or less diagrammatically in Fig. 2. It includes an electric motor 96 hung from a bracket 97 mounted on the back wall 31. Also mounted from one of the side walls in any suitable way is a combined gear and rack mechanism 98 including a reciprocable plunger 99 and a pair of crank wheels or discs 101 and 101a mounted on the ends of a driven shaft 100. The means 98 is operated by a driven pulley 102 which is driven by a belt 103 connected to the drive pulley 104 on the motor shaft. The motor 96 is suitably interlocked with the means 98 in such a manner that whenever the switch means 27 is operated once the crank wheels 101 and 101a will be turned clockwise through a single revolution and the reciprocable plunger 99 will be moved up and down once to pivot the arm 106 up and down. The details of this interlocking means are not specifically shown but one form which has been found satisfactory includes a solenoid actuated pawl and ratchet clutch connection between the pulley 102 and shaft 100, the pulley being driven continuously by motor 96 and the solenoid being actuated by switch means 27 to hold the pawl and ratchet clutch engaged for a single, complete revolution of shaft 100. Lever arms 109 and 109a are pivoted by pins 111 to the crank wheels 101 and 101a at such positions that clockwise movement of the shaft 100 through one complete revolution will first move the levers 109 and 109a forward, then backward, and then forward again. The lever 109 is pivotally connected at about the mid-point with lever 116 which is pivotally supported at the bottom of the frame, the upper end of which is pivotally connected to the slide 56 by pin 118. In exactly similar fashion by identical parts, lever 109a is connected to lever 116a, which in turn is pivoted to the back slide 56a so the two slide members work back and forth in exact synchronization.

Returning now to the description of the folding and moving mechanism itself, generally designated 23, the inlet end of the slide 56 is provided with a catch lug or fixed pawl 121 (see Fig. 5) which is moved behind the leading carton of the stack 119 when the slide 56 is moved to its backward limit (that is to the left in Fig. 5). The thickness of this lug is sufficient to engage the front carton and move it forward through the space between the forward end of the vertical wall 66 and the upstanding column 122, this space being of such width that only one carton can pass through it at a time. Arms 123 and 123a are pivoted at 124 and 124a on the upper and lower back frames 41 and 42, respectively. These arms are urged in a clockwise direction (by spring 120 shown in Fig. 9) to a normal position shown in Fig. 5 where they are positioned to engage a flat carton to open it. As best shown in Fig. 8, the end of each of the rods 123 and 123a is provided with a hinged transverse cap or lever 126 held in place by the tension spring 127 suitably mounted within the rod. The rods 123 and 123a engage the carton at upper and lower positions as shown in Fig. 2 and they serve as restraining members to open the carton. In operation they swing counterclockwise with the movement of the carton when the latter is forced against them, as shown in Figs. 6 and 7. In some cases it has been found that there is a tendency for the flat carton to buckle instead of opening when it is compressed between the lug 121 and the cap 126. To avoid this tendency to buckle, a dividing member, in this case a stiff wire 128, is mounted on the plate 129 supported on frame 41 by bolts 131 and its opposite end 132 is bent over so as to bear against the side of the upstanding support 122 near its top, in line with the upper flaps e, f, g and h. The wire end portion 132 is preferably formed with a point which is spaced from the side of the support 122 about the thickness of the cardboard used in the carton, so the wire will be readily threaded successively between the top flaps h, f, and e, g (see Fig. 6) to initiate opening the carton. When the carton is subsequently moved forward from the position of Fig. 7 the caps 126 will simply be moved aside when the tension of spring 127 is overcome, as shown in Fig. 8. It will be obvious that the dividing member 128 may take a variety of other forms; for example, another which I have found to give satisfactory results is a formed sheet or slate (not shown) having its front portion mounted to engage the flaps and separate them and having its rear portion curved in the general direction of wire 128 (Fig. 5) but not necessarily mounted on frame member 41, as is wire 128.

Figure 4:
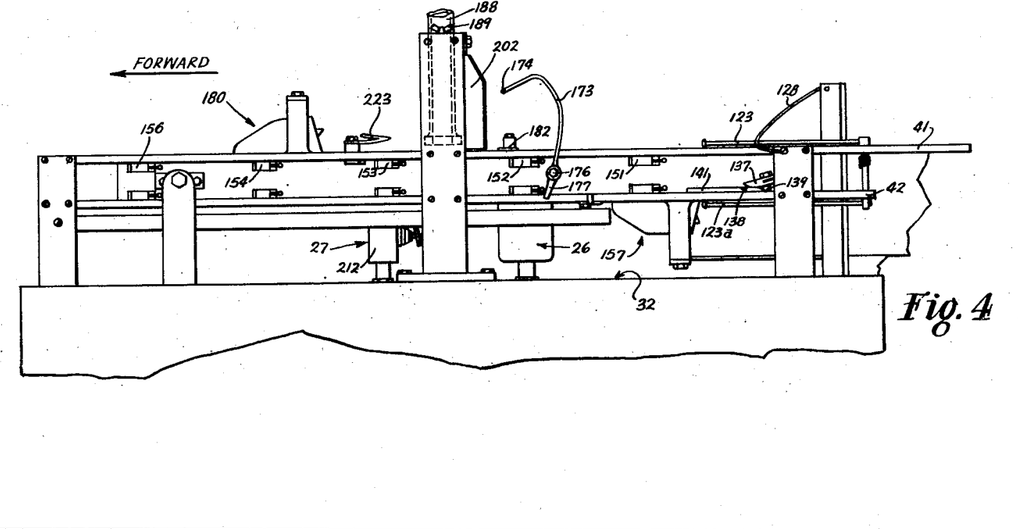
Fig. 4 is a rear view of the machine shown in Figures 1 and 2.

As best shown in Figs. 3, 4 and 5, a short shaft 133 is pivotally mounted within slide 56a and the boss 134 which is welded on that slide. At the interior end of shaft 133 is mounted a paddle or arm 136 and at the other or exterior end (Fig. 4) is a lever 137 having a curved lower surface 138. This surface 138 is engageable with a similarly curved surface 139 of cam member 141 which is mounted by screws on the lower rear rail 42 so that forward movement of the slides 56 and 56a will snap the paddle 136 upward to close the trailing flap "a" just as the carton reaches the fully opened configuration shown in Fig. 7 (this is also station II, shown in Fig. 2).

Sets of four spring pressed identical dogs or pawls, two of each on each slide, move the cartons step fashion from station to station through the folding and filling operations. One of these pawls is shown in Fig. 11 somewhat enlarged and comprises a formed piece of metal strip 142 held between the slide 56a and a coil spring 143 which in turn is mounted upon post 144 riveted to the slide. The metal strip is formed with a transverse engaging portion 146 and a diagonal sliding portion 147 both of which extend through the slide opening 148. Inward movement of the pawl is limited by the out-turned shoulder 150. The pawl is maintained properly positioned by engagement of its transverse end portion 145 within the slide opening 148. Thus, when the pawl is moved forward, the surface 146 will engage the carton and drive it forward along the rails, but when the slide movement is reversed, the pawl will be displaced outwardly through the opening 148 as it moves backward past the carton, the carton having sufficient resistance against the rails to prevent its return. Sets of such pawls 149, 151, 152, 153, 154, and 155 are mounted on slides 56 and 56a.

At the bottom of the rails 39—42, between stations II and III in Fig. 2, is mounted folding means generally designated 157 for folding the bottom flaps b, c and d. This folding means is shown in detail in Figs. 9, 12, 13 and 14. A pair of vertical supporting struts 158 is mounted on the bottom sides of rails 39 and 42. A cross-bar 159 is supported between these struts by bolts 161. A solid forming block 162 is provided with a lower vertical extension 163 which serves to mount the block by bolts 164 on the cross-bar 159. This forming block 162 in the present instance is made of aluminum in order to minimize its weight but obviously a wide selection of other materials would be satisfactory. It is formed with an upper horizontal edge 165 which is positioned at substantially the level of the bottom of the carton so that when the latter is moved across it the bottom flap b will be turned up into folded position and will ride along the top surface 166. The bottom rear surface 167 of the block is arcuately formed and at the extreme bottom edge may take a shape which can be approximately described as that of the intersection of a pair of parallel cylindrical surfaces 167a and 167b providing a groove, the bottom of which lies on a straight line 169 at their junction. A shell 171 having substantially the same shape as the rear end of the forming block just described and spaced a distance therefrom and also having the portion surrounding the block extension 163 apertured as shown at 185 in Fig. 13, is mounted in fixed position with respect to the block 162, as by screws 175 engaging the struts 158, onto the bottom of the rails 39 and 42. The opposed surfaces 167 and 170 of the block 162 and the shell 171 serve to guide the carton flaps c and d around in such a manner that they are not only folded into place but the end 62 of flap c is inserted within the slot 63 in flap d, thereby interlocking flaps c and d and completing the closure of the bottom of the carton.

Spaces 155 are provided between the block 162 and the leading vertical portions 168 of the shell 171 to permit the passage of lower side flaps c and d. As the carton is moved past the device 157, the flap b will first be turned up to closed position by engagement with the block edge 164. Then on further forward movement, the flaps c and d will follow curved paths defined by surfaces 167 and 170 which will guide them to closed positions where the extension 62 of flap c will be engaged within slot 63 of flap d. In leaving the means 157, the folded bottom flaps will be moved across the horizontal shell edge 145 to "iron" the bottom of the carton flat.

At a later stage in the operation after the carton has been filled, it will be moved across top folding means, generally designated 180, identical with the means 157, including a block 162a and shell 171a, which are exactly the same as 162 and 171 already described, and flaps f, g and h will be folded over and interlocked in exactly the same manner as described for flaps b, c, and d.

Figure 15:
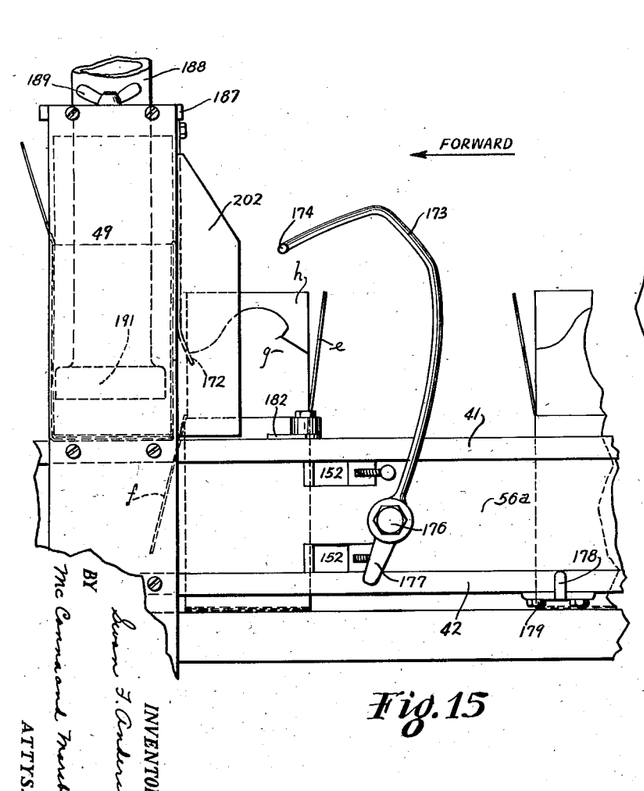

In order that the carton enter the filling housing 24 in an open condition means are provided in this case to move top leading flap f down just before it passes beneath housing lower edge portion 172. In the present instance, this means is provided as follows: a hook-shaped lever 173 (see Figs. 15 and 16) having a turned end portion 174 (Fig. 3) engageable with the flap f is pivotally mounted on the slide 56a and is carried thereby. The lever 173 is normally urged clockwise (as viewed from the back, in Figs. 15 and 16) about the pivot bolt 176 by means of a spring (not shown). The lever 173 has a lower extension 177 engageable with a stationary cam 178 which is mounted on the bottom rail 42 by bolts 179. The parts are so positioned that when the forward movement of the slides 56 and 56a brings the carton near the filling housing 24, the lever extension 177 will strike the cam 178 and quickly snap the lever 173 down upon the flap f to push the latter beneath the housing edge 172 so it will enter the housing in open condition as shown in Fig. 15.

Figure 16:
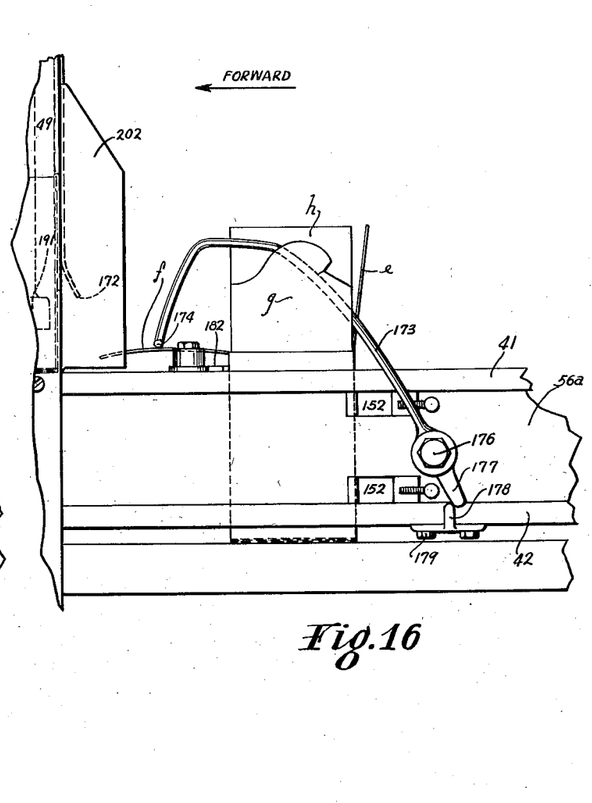
Fig. 16 is a view similar to Fig. 15 showing the above-mentioned lever at the moment it is effective to press the upper leading flap down as the carton is moved forward into filling position.

To maintain the carton properly positioned between rails 38—41 and 39—42 the horizontal distance between these pairs of rails is slightly less than the width of the carton body walls 59 so the carton is slightly compressed when moving through the machine; and to this end further the inner surfaces of the rails are formed concave as shown in Fig. 10 so four horizontally extending edges 61 are indented slightly into each side of the carton to hold it properly positioned vertically. This compression of the carton will however tend to bow the leading body wall 58 forwardly in some cases and any substantial bowing in this manner may interfere with the folding down of the flap f as described in the preceding paragraph. To minimize this forward bowing or convexity of the leading carton body wall 58, means are provided to straighten it substantially just before the lever 173 is moved down upon flap f and the carton is moved into prefilling station IV. Referring to Fig. 3, this means here shown consists of a pair of similar fingers 181 and 182, 181 being normally urged counterclockwise and 182 being normally urged clockwise by suitable spring members (not shown). These fingers 181 and 182 are so positioned on the top frame members 41 and 38, respectively, that they exert a backward, flattening pressure on the leading carton wall 58 when the latter is moved forward upon them and the lever 173 is snapped downwardly upon flap f, as shown in Fig. 16.

Figures 17, 18, 19:
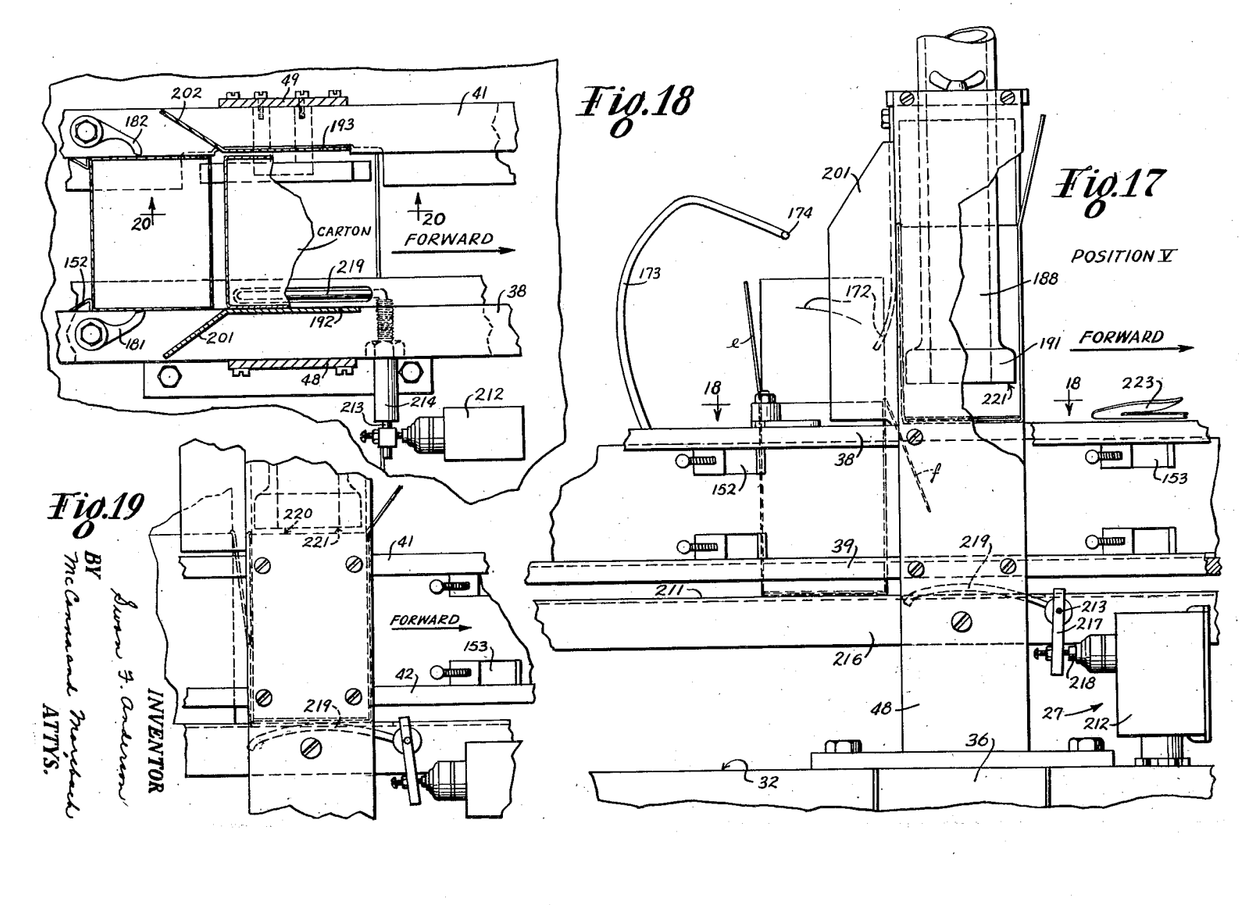
Fig. 17 is a fragmentary front view of the filling housing and the parts immediately cooperating therewith showing the carton in the raised position at the beginning of its filling operation.
Fig. 18 is a sectional view of Fig. 17 taken on the line 18—18 showing a top view of the lifting mechanism and the switch mechanism which is tripped by the carton when the latter is moved downwardly to the filled position.
Fig. 19 is a fragmentary front view similar to Fig. 17 showing the carton in its lower or filled position at the time that the carton is operative to close the switch and energize the motor to initiate forward movement of all the cartons in the machine.
Figures 20, 21, 22:
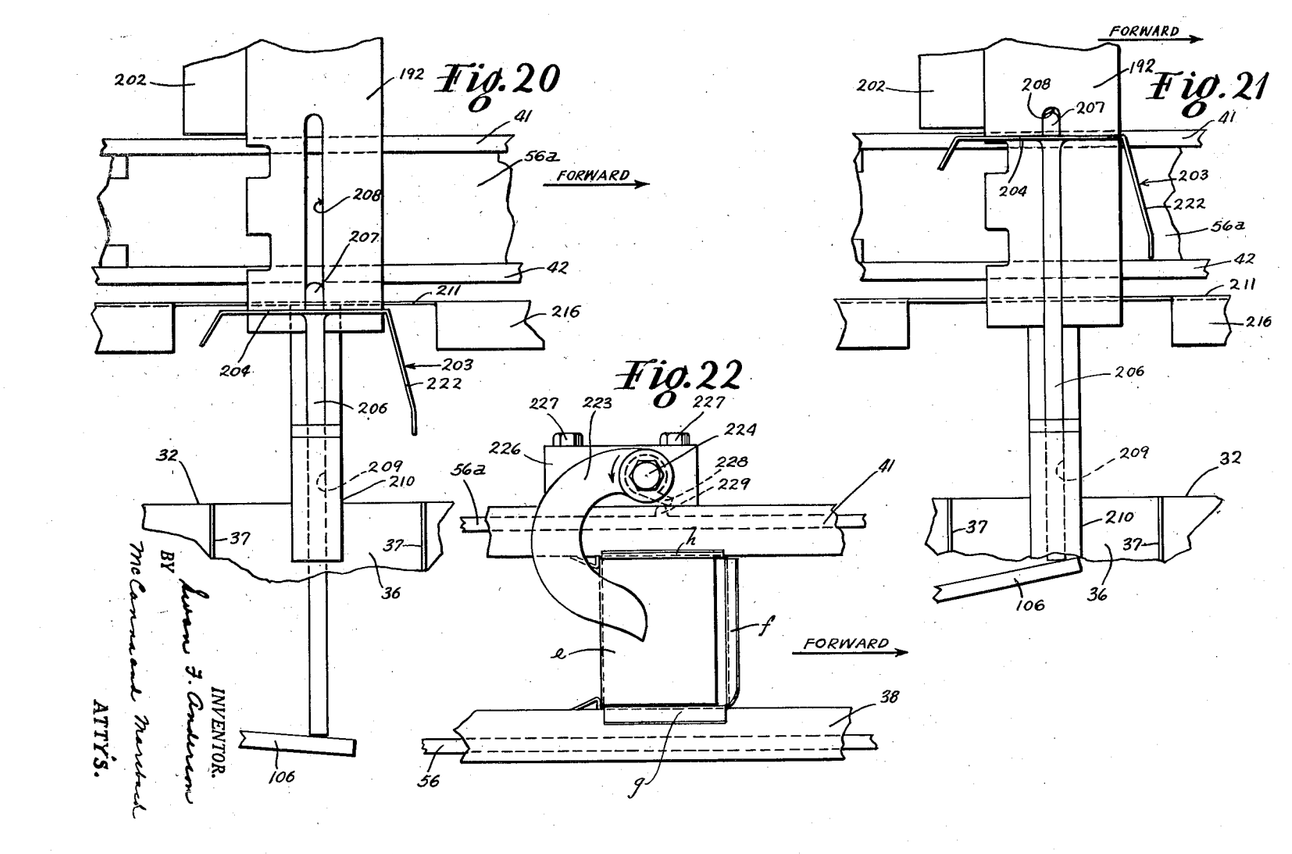
Fig. 20 is an interior view of Fig. 18, without the carton, taken on the line 20—20 showing the mechanism employed in this particular case for moving the carton upward telescopically over the end of the filling nozzle, the filling nozzle itself not being shown in this view.
Fig. 21 is a view similar to Fig. 20 showing the parts in the raised position.
Fig. 22 is an enlarged fragmentary top view showing the mechanism for folding over the top trailing flap.

The filling means previously designated 24 located at filling station V is best shown in Fig. 2a. It includes a pair of inwardly positioned shoulder members 183 and 184 mounted by bolts 186 on upper end portions of the supports 48 and 49. A plate 187 carrying the filling nozzle 188 is mounted upon the shoulder members 183—184 in a quick-detachable fashion by wing nuts 189. The bottom end portion 191 of the filling nozzle 188 is approximately the shape of and slightly smaller than the cross-section of the carton which in this case is rectangular. In the present instance, the carton is moved upward, telescopically, over the nozzle, and because of their mating cross-sections, it is maintained substantially centered with respect to the nozzle during the filling operation. Vertical guide plates 192 and 193 attached to the shoulder members 183—184, and to the rails, by screws 194 are provided spaced apart substantially the width of the carton body walls 58 to serve as further guiding means. A forward guide plate 196 is mounted onto the shoulder members 183—184 by means of bolts 197 and carries a lower outwardly flared edge portion 172; its vertical edges 198 and 199 are curved inwardly so as to coact with the flared vertical edge portions 201 and 202, respectively, of the side plates in guiding the carton side flaps g and h into the housing in open position. The filling means also has associated with it at the filling station, means for lifting the carton over the end of the nozzle 188 when the carton is moved into line therewith. Referring to Figs. 18, 20 and 21, where the lifting means is best shown, a relatively narrow sheet metal strip 203 is formed with a horizontal lifting platform 204 mounted on the upper end of the lifting rod 94, the latter being guided by a leader 207 positioned within the slot 208 in the guide plate 192 and also being guided within the slot or channel 209 formed in the downward extension 210 of the guide plate 192. The operation of the various parts will be so synchronized that when the slides 56—56a are moved to the forward end of their stroke to move a carton within the filling housing in line with the nozzle 188, the reciprocating plunger 94 is moved once through an up and down cycle to move the carton up over the end of the nozzle. The spacing of the guide plates 192—193 is sufficiently close that the empty carton is slightly compressed therebetween and will be returned to the floor 211 only when the pressure of the ice cream or other material flowing from the nozzle 188 forces it downward. The distance between the nozzle 188 and the floor 211 is approximately the height of the carton to facilitate the shearing off of ice cream between end surface 221 of the nozzle and the top edge of the carton as the latter is moved forward after the filling operation, as will be described in greater detail.

The switch means previously designated 27 and best shown in Figs. 17, 18 and 19 is provided to energize the driving means generally designated 28 through one complete operation each time a carton is moved downward to its filled position. This switch means includes switch 212 controlling the actuation of the driving means 28, and is mounted on the table 32 of the base 21. For example, as mentioned above, the motor 96 may be permitted to rotate continuously, but be operative to rotate the cranks 101—101a through a single revolution by the action of a magnetic or solenoid clutch (not shown) which is energized by the switch means. An actuating shaft 213 is pivotally journaled in a bushing 214 mounted on the downwardly skirted portion 216 of the floor member 211. A lever 217, having an adjustable screw engageable with the switch plunger 218, is mounted on the exterior end of the shaft 213 and an actuating lever 219 is mounted on the interior end thereof, the parts being so positioned that the switch 212 is operated when the carton has been moved down so the top edge 220 is approximately level with the lower end surface 221 of the nozzle 188, as shown in Fig. 19. The energization of the driving means in this manner will move a following empty carton from prefilling station IV to station V within the filling housing, thereby pushing the filled carton out and shearing off the ice cream level with the top of the filled carton. When the filled carton is moved forward out of the housing, its place is taken by the above-mentioned following empty carton which is moved immediately upward over the nozzle by the lifting member 203 (Fig. 20) as previously described. This position is shown in Fig. 17. As the member 203 is moved upwardly, its downward, forwardly inclined extension 222 (Fig. 20) will likewise be moved upwardly and will displace the filled carton forward to a position where the latter can be picked up by the next set of pawls 153.

The filled carton will then be conveyed through the remaining steps of folding the top flaps. Means to close the top trailing flap e before the carton passes the second folding means 180, already described, is best shown in Fig. 22 and comprises an arcuate hook member 223 pivotally mounted on pin 224 which in turn is mounted on block 226 attached to the top frame member 41 by bolts 227. This hook member 223 will be normally pressed to an out-of-the-way position (shown in Fig. 3) by spring means not shown. The pivoted end of the hook 223 has an extension 228 engageable with a mobile cam surface 229 formed on the slide 56a so that when the latter is moved forward the cam 229 will engage the extension 228 to move the hook 223 quickly in behind the carton to close flap e, as shown in Fig. 22. The carton will then be moved past the folding means 180 for closing and interlocking flaps f, g, and h, as already described.

Operation

In operation, it will be understood that a number of cartons will normally be moved serially and in step fashion through the machine in various set-up stages, as shown in Fig. 2, the stations or in other words, the positions of rest during the filling operation being indicated by the numerals I through VIII. To simplify the description and facilitate an understanding of the operation, however, a single carton will be traced through the machine in the description below. Furthermore, while eight separate stages or positions of rest for the carton have been shown in this particular embodiment, it will be understood that certain of them may be dispensed with in specific cases as, for instance, by combining certain steps; for example, to minimize the required length of the path between the rails 38—41 and 39—42 the carton may be moved directly from station II to station IV eliminating the separate station III; and likewise station VIII may be dispensed with by merely dropping the completely folded and filled carton from the machine as soon as it is moved from station VII.

The eight stations indicated by the numerals I through VIII in Fig. 2 show the different conditions of successive cartons when the apparatus is temporarily at rest during the time that one of the cartons is being filled at station V. While in the following explanation the course of a single carton through these eight positions will be described in detail, it will be understood that simultaneous movement of all the cartons to their succeeding stations each time is initiated by the filling of the particular carton at station V which moves that carton down to trip the actuating arm 219 to initiate a single cycle of reciprocation of the slides 56—56a. Referring to Fig. 2 where the elements of the driving means 28 are also shown in their positions of rest at any one time that a carton is being filled, actuation of the switch 212 causes the crank members 101 and 101a to rotate once, clockwise, through a complete revolution. The levers 109 and 109a are mounted on the crank members 101 and 101a, respectively, at such identical positions that clockwise rotation of the latter in this manner causes the slides 56—56a to be moved in unison, first forward, when the crank pin 111 is moved to position X; then backward, twice the forward distance, when the pin 111 is moved from X to Y; and, finally, forward to return to the Fig. 2 position. In this particular case, the extent of the initial forward movement is so predetermined that the empty carton at station IV will be moved into the filling housing in line with the nozzle 188 and the actuation of the reciprocable plunger 99 is so timed that when this empty carton is moved into alignment with the nozzle it will snap the carton upward telescopically over the end of the nozzle as shown in Fig. 17.

Assume that a stack 119 of flattened paper cartons of the type shown in Fig. 25, is contained in the feed channel 229, as shown in Fig. 5. The first reciprocation of the slides 56—56a causes the lug 121 to engage the rear edge of the leading flat carton at 231 and drive it forward from station I to erecting station II, these positions being shown in detail, respectively, in Figs. 5 and 7, an intermediate position where the carton is partially unfolded being shown in Fig. 6. As the carton is moved forward in this manner, the dividing member 128, which in this case is of formed wire, successively separates the top flaps f—g and e—h thereby initiating the opening of the carton and preventing the carton from bowing in one direction or the other without opening. The leading edge of the carton is caught by the ends of the swingable levers 123—123a which swing counterclockwise about the pin 124 at the same time restraining the forward motion of the carton, causing it to be opened or erected by applying longitudinal compression thereto. Just before the carton is fully opened, that is, just before it reaches station II (Fig. 7), the lever 137 carried by slide 56a will be snapped upwardly by engagement with the cam 141 mounted on the rail 42. This will snap the lever or paddle 136 upward to close the trailing bottom flap a, as shown in Fig. 7.

At the next reciprocation of the slides 56—56a the carton is moved from station II to station III (see Figs. 2 and 9) by pawls 149 and 151; that is the carton is moved initially forward to an intermediate position by pawls 149 and, in the final forward motion of the slides at the end of the reciprocation, pawls 151 move the carton to station III. This closes the lower leading flap b by engagement with the edge 165 (Fig. 9) of the block 162 and folds and interlocks flaps c and d as they are moved across the shell 171, as shown in Fig. 13, the finger 62 of flap c being guided into the slot 63 in flap d. Station III is therefore referred to as the folding station, and the operation of interfolding or closing the lower flaps is referred to in the claims as the interfolding step to distinguish it from the final step of closing the carton.

At the next reciprocation of the slides the carton is moved to the prefilling station IV by pawls 151 and 152 and into close proximity with the carton in the filling station, as best shown in Fig. 15. Near the end of the final forward movement of the carton, the lever 173 on the slide 56a is tripped by the cam 178 on the frame 42 and moves the upper leading flap f downward to clear the lower edge 172 of the filling housing (see Figs. 15 and 16) so that in the next step the carton will enter the housing in open condition. After passing the cam 178 the lever 173 will be returned by spring pressure to its normal position shown in Fig. 15.

At the initial forward movement of the next reciprocation the carton is moved into the filling housing 24 by pawls 152 called the filling station V. It will then be lifted on platform 204 (Figs. 20 and 21) during which the carton's open top moves telescopically upward over the mouth of the filling nozzle 188, preferably until the end of the nozzle approaches the flap a, which is now the bottom inside surface of the carton.

Ice cream flowing continuously from the nozzle 188 now flows into the carton and the pressure forces the newly introduced carton down until it is filled, at which point it depresses the actuating arm 219 to operate switch 212 and energize the operating means 28. This reciprocates the slides to move the following empty carton forward from station IV which pushes the filled carton forward from beneath the nozzle, shearing off the ice cream flush with the carton surface and replacing the filled carton immediately with an empty one. An important phase of the invention lies in the structure which keeps a carton in filling position at all times, making it unnecessary to provide additional means to start and stop the flow of ice cream. As this empty, following carton is lifted by the platform 204 (Figs. 20 and 21) the upward movement of the forward oblique extension 222 of that platform will move the filled carton forward to an extent that the latter can be engaged in the next step by pawls 153 which moves the filled carton to station VI. Just prior to reaching station VI, the lug 229 on slide 56a (Fig. 22) engages the extension 228 of the curved lever 223 and rotates the latter counterclockwise behind the carton and folds top trailing flap e down into place in the same manner that flap a was folded into place by lever 136 when the carton was moved between stations I and II, already described.

At the next reciprocation of the slides the carton is moved to closing station VII by pawls 153 and 154. In doing so, the carton is moved against the member 162a (Fig. 23) which is identical to member 162 (Fig. 12) and the formed shell 171a (Fig. 23) which is identical to formed shell 171 (Fig. 13). The leading flap f is folded in place by movement across the edge 164a of the stationary member 162a (Fig. 23) and the side flaps g and h are folded over and interlocked by movement against the curved surface of the stationary shell 171a.

At the next reciprocation of the slides the carton is moved to station VIII (see Fig. 23) by pawls 154 and 156 where at this stage it has been completely filled, folded and ready for storage or marketing.

While a particular form of the present invention has been shown it will be apparent that certain changes therein will readily suggest themselves to others skilled in the art without departing from the spirit and scope of the invention. Having thus described the invention, what is claimed as new is:

1. Apparatus for automatically setting up, filling, and closing the flaps of a carton supplied initially flat having four body walls and a flap hinged at each end of each wall, two opposed flaps at each end being formed to be interlocked with one another, comprising spaced frame members supported on a base and defining for said carton a path of movement having an inlet and an outlet, slide means reciprocably mounted on said frame means and having a number of pawls spaced therealong for moving a carton from one to the other stepwise between successive predetermined positions in said path upon successive reciprocations of the slide means, means for reciprocating said slide means, means for supporting a stack of said cartons in said initially flat condition and feeding them to one of said pawls so as to be fed one at a time into the inlet of said path, resilient means mounted adjacent said frame members for applying a restraining force to the leading edge of a forwardly moving flat carton operable simultaneously with means for dividing the flaps at one end thereof to effect the opening of said carton between said frame members in such a manner that one flap at each carton end is a leading flap and one at each end is a trailing flap and the two flaps at each end which are formed to be interlocked are positioned as side flaps, a member positioned proximate said frame members and movable by said slide means for closing the trailing flap at one end after the carton has been opened, a set of stationary members having surfaces engageable with the remaining flaps at said one end when said carton is moved therepast so that the leading flap is first closed and then the side flaps are closed and interlocked, a nozzle positioned above said path for supplying material therethrough to said carton when the latter is moved in proximity to it, another member movable by said slide means and positioned proximate said frame members for closing the trailing flap at the other end of the carton, and another set of stationary members having surfaces engageable with the remaining flaps when said carton is moved therepast so that the leading flap is first closed and then the side flaps are closed and interlocked.

2. Apparatus for automatically setting up, filling, and closing the flaps of a carton supplied initially flat having four body walls and a flap hinged at each end of said wall, two opposed flaps at each end being formed to be interlocked with one another, comprising spaced frame members supported on a base and defining for said carton a path of movement having an inlet and an outlet, slide means reciprocably mounted on said frame means and having a number of pawls spaced therealong for moving a carton from one to the other stepwise between successive predetermined positions in said path upon successive reciprocations of the slide means, means for reciprocating said slide means, means for supporting a stack of said cartons in said initially flat condition and feeding them to one of said pawls so as to be fed one at a time into the inlet of said path, resilient means mounted adjacent said frame members for applying a restraining force to the leading edge of a forwardly moving flat carton operable simultaneously with means for dividing the flaps at one end thereof to effect the opening of said carton between said frame members in such a manner that one flap at each carton end is a leading flap and one at each end is a trailing flap and the two flaps at each end which are formed to be interlocked are positioned as side flaps, a member positioned proximate said frame members and movable by said slide means for closing the trailing flap at one end after the carton has been opened, a set of stationary members having surfaces engageable with the remaining flaps at said one end when said carton is moved therepast so that the leading flap is first closed and then the slide flaps are closed and interlocked, a nozzle positioned above said path for supplying material therethrough to said carton when the latter is moved in proximity to it, the end of said nozzle having a width at least as great as the width of said carton and substantially coplanar with the top of the carton when filled so that subsequent movement of the carton past the nozzle is effective to shear off said material at the top of the carton and leave the latter filled, another member movable by said slide means and positioned proximate said frame members for closing the trailing flap at the other end of the carton, and another set of stationary members having surfaces engageable with the remaining flaps when said carton is moved therepast so that the leading flap is first closed and then the side flaps are closed and interlocked..

3. Apparatus for automatically setting up, filling, and closing the flaps of a carton supplied initially flat having four body walls and a flap hinged at each end of said wall, two opposed flaps at each end being formed to be interlocked with one another, comprising spaced frame members supported on a base and defining for said carton a path of movement having an inlet and an outlet, slide means reciprocably mounted on said frame means and having a number of pawls spaced therealong for moving a carton from one to the other stepwise between successive predetermined positions in said path upon successive reciprocations of the slide means, means for reciprocating said slide means, means for supporting a stack of said cartons in said initially flat condition and feeding them to one of said pawls so as to be fed one at a time into the inlet of said path, resilient means mounted adjacent said frame members for applying a restraining force to the leading edge of a forwardly moving flat carton operable simultaneously with means for dividing the flaps at one end thereof to effect the opening of said carton between said frame members in such a manner that one flap at each carton end is a leading flap and one at each end is a trailing flap and the two flaps at each end which are formed to be interlocked are positioned as side flaps, a member positioned proximate said frame members and movable by said slide means for closing the trailing flap at one end after the carton has been opened, a set of stationary members having surfaces engageable with the remaining flaps at said one end when said carton is moved therepast so that the leading flap is first closed and then the side flaps are closed and interlocked, a nozzle positioned above said path for supplying material therethrough to said carton when the latter is moved in line with it, a lifting member operable to move the carton telescopically over the end of the filling nozzle when the carton is moved in line with said nozzle and operable to permit the carton to move telescopically away from the nozzle upon the supplying of material to said carton, means responsive to the movement of said carton to its filled position to move said slide means to effect shearing of the material in said carton from the stream flowing from the nozzle by relative movement between the end of the nozzle and a trailing edge of the carton, another member movable by said slide means and positioned proximate said frame members for closing the trailing flap at the other end of the carton, and another set of stationary members having surfaces engageable with the remaining flaps when said carton is moved therepast so that the leading flap is first closed and then the side flaps are closed and interlocked.

4. In apparatus for automatically setting up, closing the flaps of and filling a carton having both inner and outer closure means at top and bottom, said carton normally being supplied to said apparatus in flattened condition, the combination of spaced parallel frame means supported on a base member and defining a path of movement for said carton, intermittently movable means mounted on said frame means for moving cartons stepwise through a series of operative positions, means for feeding said cartons one at a time into one end of said frame means in flattened condition and moving it forward upon a stationary divider for parting adjacent flaps to initiate the opening of said carton, and means operative concurrently with said forward movement on said divider for restraining forward movement of the leading edge of said carton to open said carton to a substantially rectangular shape, a lever actuated by a cam movable by said movable means for closing the trailing bottom inner flap after said carton has been substantially opened to a rectangular cross-section, a block mounted below said frame means having an upwardly facing stationary surface over which said carton is moved to close the leading bottom flap, another stationary member having a pair of upwardly facing curved surfaces engageable respectively with the bottom outside flaps to close and interlock them when said carton is moved thereagainst, another lever movable by engagement with a cam movable by said movable means for opening the leading inner top flap, a stationary nozzle mounted over said frame means beyond the position where the said top leading flap is opened, means for lifting said carton upward telescopically over the end of said nozzle to receive material flowing therefrom when said movable means moves said carton to a material receiving position in line with said nozzle, said carton being moved away from said nozzle by the material supplied thereto, switch means operable by the movement of said carton to a predetermined position away from said nozzle for energizing driving means to actuate said movable means to move said carton out of said material receiving position, a lever actuated by engagement of a cam carried by said movable means for closing the top inner trailing flap when said carton is moved from said material receiving position, a block mounted above said frame having a downwardly facing stationary surface over which said carton is moved to close the leading top inner flap, another stationary member having a pair of downwardly facing curved surfaces engageable respectively with the top outside flaps to close and interlock them when said carton is moved thereagainst.

5. Apparatus for setting up, supplying material to, and closing cartons supplied initially flat, each having a pair of closure means, comprising means for supporting cartons for movement in step fashion through a plurality of stations, means disposed between the several stations operative on the carton in the order named for opening said carton from its initially flat configuration, for interfolding one of said closure means, and for closing the other of said closure means, filling means for supplying a predetermined quantity of material to said carton subsequent to said interfolding and prior to said closing of the carton closure means, said filling means including a nozzle positioned above the path of movement of the cartons, the lower end of the nozzle normally being substantially coplanar with the top of the adjacent carton, driving means for moving said cartons between said stations, and means responsive to filling of said carton to a preselected level for actuating the driving means to effect movement of said carton past said nozzle to shear off said material in the filled carton level with the carton top and to simultaneously move a subsequent carton into filling position.

6. Apparatus for erecting, interfolding, filling, and closing a carton having a body and flaps hinged to opposite ends of the body, the carton being furnished to the apparatus as a flattened parallelogram, said apparatus comprising stationary means for supporting a plurality of cartons for movement serially therealong in step fashion through a plurality of stations, driving means for moving said cartons one at a time along said supporting means from station to station, means positioned along said supporting means to apply longitudinal compression to said carton to open the same, means operable concurrently with the latter means for initiating the opening of said carton and preventing buckling thereof under longitudinal compression, means for closing one end of a carton including means positioned along said supporting means operative in response to movement of the carton to interfold the flaps at one end of said body, means for closing the other end of a carton including means positioned along said supporting means to engage the carton after filling and interfold the flaps at the other end of the body, means disposed at one of said stations for filling the carton with material comprising a spout of approximately the cross-sectional shape of said carton body, means for effecting relative movement of the spout and carton in said one station to bring the spout into the body of the carton, means for effecting relative movement of the carton and spout in response to the pressure of material entering the carton from the spout, and means for actuating the driving means in response to a predetermined degree of the last-mentioned movement to move the cartons forward to the next station and bring an empty carton into said one station.

7. In a machine of the character described, means for supporting a plurality of cartons for movement serially in step fashion through a plurality of stations arranged in series including a filling station, driving means for moving a carton from each of said stations to the next station through one step, means for erecting said cartons in response to movement thereof between certain of said stations, means including means operative in response to movement of a carton for closing one end of said carton, means including means operative in timed relation to the movement of the carton for closing said carton, means at said filling station for supplying material to a carton disposed thereat, means for effecting relative movement of the filling means and the carton in a transverse direction proportional to the degree of filling of said carton, and means operative in response to relative transverse movement of the filling means and the carton at the filling station for operating the driving means to step all of the cartons forward to a succeeding station.

8. In a machine of the character described, means for supporting a plurality of cartons for movement serially in step fashion through a plurality of stations arranged in series including a filling station, driving means for moving a carton from each station to the next through one step upon each energization of the driving means, means for erecting said cartons in response to movement thereof between certain of said stations, means including means operative in response to movement of a carton for closing one end of said carton, means including means operative in timed relation to the movement of the carton for closing said carton, means for filling said cartons at said filling station comprising a spout of approximately the cross-sectional shape of said carton, means for effecting relative movement of the spout and carton in said filling station to bring the spout into the carton, means for effecting relative movement of the carton and spout in response to the flow of material into the carton, and means for energizing the driving means in response to a predetermined degree of the last-mentioned movement to move the cartons forward to the next station and bring an empty carton into the filling station.

9. In a machine of the character described, means for supporting a plurality of cartons, each having a body and a plurality of closure flaps, for movement serially in step fashion through a plurality of stations arranged in series including a filling station and a prefilling station in side by side approximately abutting arrangement, means for moving a carton from each station to the next through one step upon energization thereof, means for erecting said cartons in response to movement thereof between certain of said stations, means including means operative in response to movement of a carton for closing one end of said carton, means including means operative in timed relation to the movement of the carton for closing said carton, means for filling said cartons at said filling station, comprising a nozzle for supplying a continuous flow of material to said carton, and means for supporting said nozzle and carton with the mouth of the nozzle substantially coplanar with the top edge of the carton body when the carton is filled with material, and means for energizing said driving means when the carton is filled with material to step said cartons forward to a succeeding station and thereby move a carton from the prefilling station into the filling station to commence filling of the succeeding carton and move the top of the filled carton past the mouth of the nozzle to shear off excess material above the level of said top edge of the carton.

10. Container filling apparatus comprising means supporting containers for movement in step fashion through a preselected path, a nozzle disposed above said path of movement of the containers for supplying material to the container disposed beneath the nozzle, a lifting member positioned below the nozzle operative to raise the container disposed beneath the nozzle telescopically over the lower end of the nozzle for filling and operative after raising the container to move downward to permit said container to lower as the latter is filled, said supporting means being positioned to support the filled container with the top thereof substantially coplanar with the lower end of the nozzle, and said supporting means after the filling of said container being operative to engage the filled container and to effect movement of the filled container past the nozzle to shear off the material above the level of the top of the container by the movement of the top of the container past the lower end of the nozzle.

11. Container filling apparatus comprising means supporting containers for movement in step fashion along a preselected path, driving means operative intermittently to actuate said supporting means to effect said movement of the containers, a nozzle disposed above said path of movement of the containers for supplying material to the container disposed beneath the nozzle, a lifting member disposed beneath the nozzle operative to raise the container which is disposed beneath the nozzle telescopically over the lower end of the nozzle for filling and operative after raising the container to move downward to permit said container to lower as the latter is filled, said supporting means after the filling of said container supporting the filled container with the top thereof substantially coplanar with the lower end of the nozzle, switch means operable by movement of said carton telescopically away from the nozzle to its filled position to render said driving means effective to actuate said supporting means for moving the filled container past the nozzle, and said supporting means being operative upon such actuation to effect movement of the filled container past the nozzle to shear off the material above the level of the top of the filled container by the movement of the top of the filled container past the lower end of the nozzle.

12. Container filling apparatus comprising means supporting containers for movement in step fashion through a preselected path, a nozzle disposed above said path of movement of the containers for supplying material to the container disposed beneath the nozzle, a lifting member positioned below the nozzle operative to raise the container disposed beneath the nozzle telescopically over the lower end of the nozzle for filling, container engaging means located adjacent the nozzle positioned to engage opposite sides of the raised container and to bear against said container sides for releasably maintaining said container in its raised position and operable to permit the container to lower under the pressure of the material deposited therein from the filling nozzle, and means responsive to the lowering of the container being filled for actuating said supporting means to move the filled container past the nozzle.

13. Container filling apparatus comprising means supporting containers for movement in step fashion through a plurality of stations along a preselected path, a nozzle at the filling station along said path disposed above said path of movement of the containers for supplying material to the container located beneath the nozzle at the filling station, a lifting member disposed beneath the nozzle operative to raise the container at the filling station telescopically over the lower end of the nozzle for filling and to retract downwardly away from the raised container, container engaging plates located at the filling station at opposite sides of said path of movement of the containers, said container engaging plates being interposed in the path of movement of opposite sides of the container at the filling station when said container is raised and operative to exert inward forces on said opposite sides of the container to releasably maintain said container in its raised position after said lifting member is retracted away from the raised container and operable to permit said container to lower under the pressure of the material discharged thereinto from the nozzle, said supporting means after the container is filled and lowered supporting the filled container with the top thereof substantially coplanar with the lower end of the nozzle, and means for actuating said supporting means to move the filled container beyond the filling station, said supporting means being operative upon such actuation to effect movement of the filled container past the nozzle to shear off the material above the level of the top of the filled container by the movement of the top of the filled container past the lower end of the nozzle.

SWAN F. ANDERSON.

REFERENCES CITED

The following references are of record in the file of this patent:

UNITED STATES PATENTS

| Number | Name | Date |
|---|---|---|
| 793,014 | Mitchell et al. | June 20, 1905 |
| 1,044,500 | Converse | Nov. 19, 1912 |
| 1,527,030 | Delamere et al. | Feb. 17, 1925 |
| 2,010,524 | McClatchie | Aug. 6, 1935 |
| 2,089,273 | Lakso | Aug. 10, 1937 |
| 2,091,426 | Benoit | Aug. 31, 1937 |
| 2,180,954 | Harrison | Nov. 21, 1939 |
| 2,206,761 | Bergstein | July 2, 1940 |
| 2,280,773 | Ferguson | Apr. 28, 1942 |
| 2,305,130 | Banta | Dec. 15, 1942 |
| 2,318,208 | First et al. | May 4, 1943 |